United States Patent [19]
Callerame

[11] 3,763,006
[45] Oct. 2, 1973

[54] PROCESS FOR PRODUCING CHLORINE DIOXIDE

[75] Inventor: Mary Lou Callerame, Rochester, N.Y.

[73] Assignee: Chemical Generators, Inc., Rochester, N.Y.

[22] Filed: Mar. 24, 1971

[21] Appl. No.: 127,791

Related U.S. Application Data
[63] Continuation of Ser. No. 773,008, Nov. 4, 1968, abandoned.

[52] U.S. Cl. .................... 204/103, 23/85, 23/152, 204/95, 204/101
[51] Int. Cl. .................... C01b 11/26, C01b 11/02
[58] Field of Search .................... 23/85, 152; 204/95, 204/101, 103, 128

[56] References Cited
UNITED STATES PATENTS
2,163,793  6/1939  Logan ............................. 204/101
2,717,237  9/1955  Rempel ........................... 204/101
3,495,935  2/1970  Callerame ........................ 23/85

FOREIGN PATENTS OR APPLICATIONS
322,975  8/1957  Switzerland ...................... 204/103
714,828  9/1954  Great Britain .................... 204/101

Primary Examiner—F. C. Edmundson
Attorney—McGlew and Toren

[57] ABSTRACT

Process of producing chlorine dioxide. Aqueous lithium chlorite is subjected to electrolysis in a cell wherein the anode is separated from the cathode by a semi-permeable membrane. The procedure is advantageously carried out in a unit in which the lithium chlorite solution is first produced by reaction of alkali metal chlorate and perchloric acid in the presence of lithium ion.

1 Claim, 1 Drawing Figure

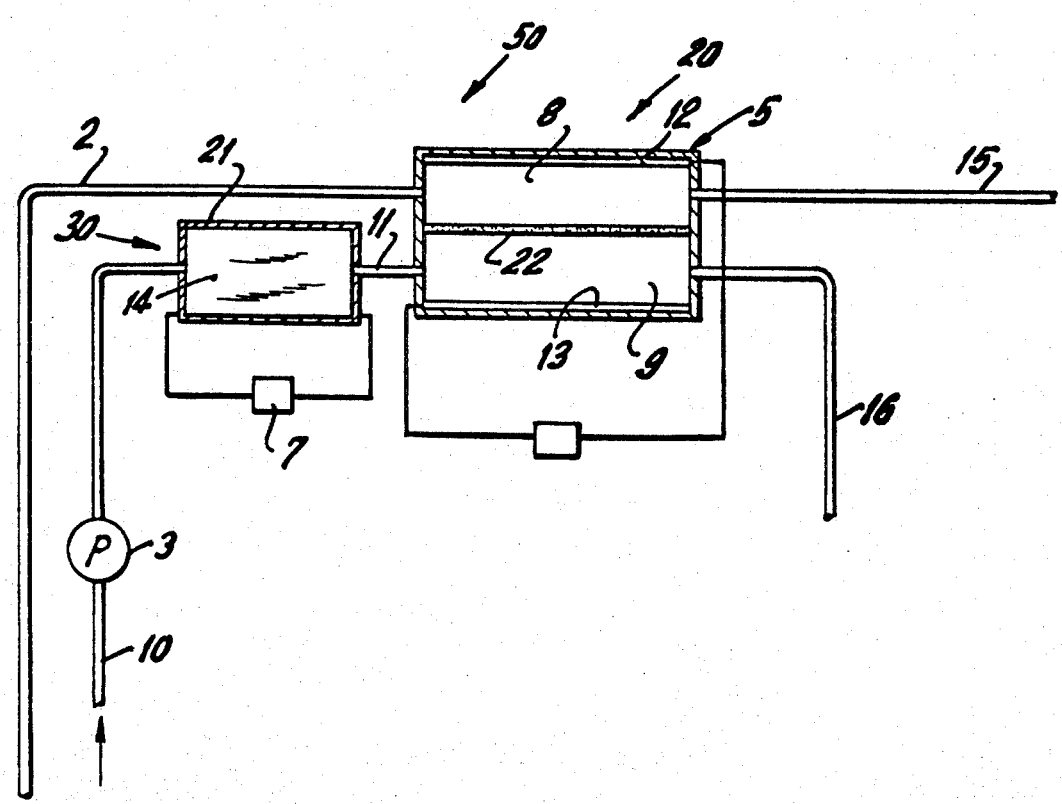

PROCESS FOR PRODUCING CHLORINE DIOXIDE

This application is a continuation of application Ser. No. 773,008, filed Nov. 4, 1968, now abandoned.

SUMMARY OF THE INVENTION

This invention relates to chlorine dioxide production and is particularly directed to a new procedure for producing chlorine dioxide by electrolyzing lithium chlorite. Considered from another aspect, the invention is concerned with a chlorine dioxide producing unit or generator in which chlorine dioxide is electrolytically produced from lithium chlorite, the lithium chlorite, in turn, having first been produced in the same generator from alkali metal chlorate and perchloric acid in the presence of lithium ion which is supplied by a lithium salt.

In copending application, Ser. No. 721,053, now U.S. Pat. No. 3,495,935, there is disclosed a process for producing alkali metal chlorites, wherein alkali metal chlorate is reacted with perchloric acid in the presence of alkali metal chloride at elevated temperature. Subsequent investigations have revealed that lithium chlorite, which thus may be produced according to the teachings of the copending patent application referred to, exhibits characteristics which are peculiar to this alkali metal chlorite and which are lacking in the other alkali metal chlorites such as, for example, sodium- and potassium chlorite. I have thus found that an aqueous lithium chlorite electrolyte can be successfully electrically dissociated into chlorine dioxide and lithium hydroxide in an electrolytic cell in which the cathode is separated from the anode by a semi-permeable membrane. Without wanting to be limited by any theories advanced by me, it is believed that the electrolytic reaction proceeds according to the following formula:

$$LiClO_2 + H_2O \rightarrow LiOH + ClO_2 + \tfrac{1}{2}H_2^+ \tag{1}$$

The chlorine dioxide is obtained at the anode. The best results are obtained if a potential is applied which induces a current flow of about 2–9 amperes. The behavior of the lithium chlorite is in contrast to that of the other alkali metal chlorites whose electrolysis results in the formation of free chlorine and the corresponding alkali metal oxide. The formed alkali metal oxide then reacts in the presence of water under the formation of the alkali metal hydroxide and hydrogen gas. Consequently, while reaction (1) which exclusively pertains to lithium chlorite, results in the direct formation of anodic chlorine dioxide, the electrolysis of the other alkali metal chlorites yields chlorine and hydrogen gas.

Accordingly, it is a principal feature of this invention to produce chlorine dioxide from aqueous lithium chlorite in an electrolytic cell wherein the cathode is separated from the anode by a semi-permeable membrane.

Chlorine dioxide is of considerable industrial importance and has found use in the bleaching of wood pulp, fats, oils and flour. Generally, chlorine dioxide is used as a bleaching agent and for removing undesirable tastes and odors from water and the like liquids. For this reason, the use of chlorine dioxide is particularly popular in swimming pools. For several of the established uses of the chlorine dioxide, it is desirable to produce the chlorine dioxide in situ so that the chlorine dioxide, upon formation, can be directly put to use either in gaseous form or, after absorption, in the form of an aqueous solution. Accordingly, the invention also provides for a procedure in which the chlorine dioxide is produced in situ in a generator from lithium chlorite which, in turn, is first formed in the same generator from alkali metal chlorate and perchloric acid in the presence of lithium ion, which latter is supplied by a by a lithium salt. In essence, therefore, a primary object of the invention is to provide a generator in which lithium chlorite is first formed from alkali metal chlorate and perchloric acid in the presence of lithium ion and water, whereupon the lithium chlorite is electrically dissociated into $ClO_2$ and lithium hydroxide. The lithium of the lithium hydroxide can be re-used, for example recycled, or can be recovered as a valuable by-product. The reactions that take place in the generator can thus be exemplified by the following formulas:

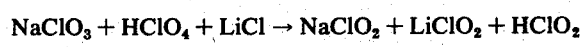

$$(2)$$

The teachings of the prior patent application can thus be successfully combined with the teachings of the present invention to produce chlorine dioxide in an in situ reaction in an economical and safe manner.

Since sodium chlorate is the least expensive of the alkali metal chlorates and lithium chloride is the least expensive of the lithium salts, the reaction is preferably carried out in the manner exemplified by formula 2). However, other alkali metal chlorates, such as potassium chlorate, may be used. Further, the lithium ion may be supplied by other lithium salts, such as the carbonate, bicarbonate or nitrate.

The reactants are supplied to a reaction chamber in which the reaction mixture is heated to about 100° C. Generally, a temperature range of about 80° – 100° C is suitable. The reactants may be supplied to the chamber in the form of a premixed aqueous solution. The generator preferably comprises tow interconnected components or units. The first unit includes the reaction chamber referred to. In this chamber, which may be in the form of a temperature block with an interior flow passage, the reactants are heated to the desired temperature range resulting in the formation of lithium chlorite. The reaction solution, including the formed lithium chlorite, is then cooled by the ambient air and introduced into the second component of the generator which essentially consists of an electrolysis or migration chamber. In order to increase the reaction area and to render continuous operation possible, the electrolysis chamber forms preferably a helical or tortuous path to be traversed by the entering solution. The migration chamber contains an anode and a cathode which may be in the form of plates or wires embedded in, or secured to, opposite walls of the chamber, so that the incoming solution, while traversing the chamber, flows along the tortuous path. The electrodes should be inert to the reactants. Both the anode and the cathode may consist of platinum metal. Carbon, mercury or other electrode materials are also suitable. The tortuous or helical path of the electrolysis chamber is separated, as are thus the two oppositely arranged electrodes, by means of a semi-permeable membrane. The membrane may consist of plastic material and any commercially available semi-permeable membrane material is suitable. A suitable potential is applied to the electrolytic circuit to induce a current of about 2 – 9 amperes, resulting in migration of the formed chlorine dioxide to the anode. A circulating water system is preferably arranged adjacent the anode so that the formed chlorine dioxide dissolves in water and an aqueous chlorine dioxide solution is discharged. The electrolytic dissociation of the lithium chlorite and the by-products which are formed in the first, lithium chlorite producing unit can be indicated by the following formula:

$$NaClO_2 + LiClO_2 + HClO_2 \rightarrow 3ClO_2^- + H^+ + Na^+ + Li^+$$

$$3ClO_2^- \text{ to anode}$$

$$H^+ + Na^+ + Li^+ \text{ to cathode}$$

(3)

The cathode reaction can be indicated by the following formula:

$$H + Na + Li + H_2O \text{ yields } NaOH + LiOH + H_2$$

$$H_2 \text{ is vented and liberated}$$

(4)

The sodium hydroxide and the lithium hydroxide may either be discarded or recovered. If recovered, the two hydroxides may be reacted with, for example, hydrochloric acid, cooled and separated and the formed lithium chlorite recycled to the lithium chlorite producing unit.

It will thus be appreciated that the desired chlorine dioxide may be produced from lithium chlorite which either is supplied to the reaction from an external source or which is formed in situ in the generator from alkali metal chlorate and perchloric acid in the presence of lithium ions.

The reactants, alkali metal chlorate, perchloric acid and lithium salt, react in the ratio 4 : 2 : 1, to wit, four parts of sodium chlorate, two parts of perchloric acid and one part of lithium chloride are to be supplied to the generator if the lithium chlorite is to be prepared in situ. As previously stated, the lithium chloride could be replaced by other lithium salts such as, for example, lithium carbonate, bicarbonate or nitrate.

The initial aqueous solution of the alkali metal chlorate, the perchloric acid and the lithium salt may have a concentration of up to 40 percent of alkali metal chlorate, 20 percent of perchloric acid and 10 percent of lithium salt.

The various features of novelty which characterize the invention are pointed out with particularity in the claims annexed to and forming a part of this specification. For a better understanding of the invention, its operating advantages and specific objects attained by its use, reference should be had to the accompanying drawing in which there is illustrated and described a preferred embodiment of the invention.

In the drawings:

The single FIGURE is a diagrammatical over-all representation of the inventive procedure as carried out in a generator.

Referring now to the drawing, the generator according to the invention is diagrammatically indicated by reference numeral 50. The reactants, to wit, alkali metal chlorate, perchloric acid and lithium salt, for example lithium chloride, are supplied to the generator 50 in the form of an aqueous solution through a conduit 10. The solution is conveyed through the generator 50 by means of a pump, generally indicated by reference numeral 3. The pump forces the solution into the first reaction unit, generally indicated by reference numeral 30, which is in the form of a heated reaction chamber 21. The reaction chamber 21 contains a temperature block as diagrammatically indicated by reference numeral 14. The temperature block is heated by suitable heating means, the power source and the thermocouple for the heating unit being diagrammatically indicated at 7. The temperature block forms an interior flow passage by way of coiled glass or plastic tubing arranged within the block, to permit efficient heating of the traversing solution while increasing the reaction area. Lithium chlorite and sodium chlorite are formed in the reaction chamber 30 and the reaction product is conveyed through line 11 to the second reaction unit, generally indicated by reference numeral 20. The second reaction unit is a cell including a migration or electrolysis chamber, generally indicated by reference numeral 5, whose anode chamber 8 is separated from the cathode chamber 9 by means of a semi-permeable membrane 22. An anode and a cathode, for example of platinum, carbon or mercury and indicated by reference numerals 12 and 13, respectively, are arranged on and extend along opposite walls of the chamber 5. The chamber 5 is preferably elongated and of helical or spiral configuration to provide a tortuous path through which the solution is forced continuously. In this manner, the reaction surface is extended in the most economical way and continuous operation can be effected. A potential is applied to induce a current of about 2 – 9 amperes. The solution enters the cathode chamber through the conduit 11 and the chlorine dioxide migrates through the membrane 22 into the anode chamber and is withdrawn through the exit pipe 15. If it is desired to recover the chlorine dioxide in the form of an aqueous solution, water may be circulated through the anode chamber 8 and, for this purpose, a water inlet system 2 may be provided so that the chlorine dioxide will dissolve in the water before it is withdrawn through conduit 15. Reference numeral 16 indicates the withdrawal or exit tube from the cathode chamber.

The invention will now be described by an Example, it being understood, however, that this Example is given by way of illustration and not by way of limitation and that many changes may be effected without affecting in any way the scope and spirit of the invention as recited in the appended claims.

EXAMPLE 40 g of sodium chlorate, $NaClO_3$, and 10 g of lithium chloride were added to a 20 percent aqueous solution of perchloric acid and run through the generator previously described. Pure $H_2O$ was then flushed through for cleaning purposes. One litter of deionized, doubly distilled water was allowed to flow through the anode chamber. The current flow in the cell amounted to about 7 amperes. The solution was recollected at the exit or discharge end of the chamber, mixed by inversion and read in a Beckman DU at 343mu against a water blank. The optical density was compared to a standard linear curve of $ClO_2$ gas in aqueous solution drawn at 343mu on the same Beckman DU. The resulting solution showed an optical density which was higher than the highest standard and the optical density was too high to be measured by calculation. The sample of the resulting was thus diluted by pouring 1 ccm of the solution into 1000 ccm of water and the diluted solution was then compared again to the normal standard curve. The resulting solution indicated 57 mg/1000 cc. Since the dilution factor was 1000, the recovery was thus 57 g. The theoretical yield would be 67 g, so that the actual yield was 85 percent. The rate of flow through the generator was 1oo ml/min., while the total reaction time was 10 minutes. The total flushing time was 20 minutes. The $ClO_2$ was measured 30 minutes after completion of the reaction time. The reaction time was governed by the size of the apparatus. In the present case, the tests were performed in an apparatus of laboratory experimental size. If desired, an apparatus or generator of greater size could be used to produce larger quantities of gas. Larger size apparatus are to be preferred since the $ClO_2$ solubility in water is only about 6 percent. Accordingly, the water circulating through the anode chamber should be moved at such a rate so as to maintain the concentration of $ClO_2$ in water below 6 percent. By having a larger apparatus, this can be accomplished more easily.

The test was repeated several times and in each case the resulting yield was between 85 and 87 percent. In some of the tests, the apparatus was not flushed with water which resulted in a yield of about 91 percent. In a further test, a still higher yield of 96 percent was obtained. All yields were measured by UV spectrograph. Scans in the UV range of 140–400mu were run on each recovery. The graphs revealed that only $ClO_2$ migrated in the chamber and that no free chlorine was formed. Only one peak was observed at 343mu, and no other peak could be detected on the graph. While minor amounts of $ClO_2$ may be absorbed in the system, continuous operation results in yields of up to 96 percent as demonstrated by the experiments.

It should be noted that it has previously been suggested that perchloric acid has a tendency to explode at temperatures above 92° C. At the percentages of up to 40 percent as have been employed in my tests and in combination with the other reactants as described, no evidence of volatility or explosion tendency of perchloric acid was found. The premixed solution of perchloric acid, alkali metal chlorate and lithium chloride is stable and can be stored for long periods of time. However, it is recommended to avoid freezing of the premixed solution or storing it at temperatures exceeding 70° C.

The lithium which is contained in the solution discharged from the generator may be recovered by precipitation with hydrochloric acid and then reintroduced into the system. This, of course, reduces the expense of operation.

Some of the advantages and characteristics of the inventive procedure to be performed in the inventive generator may be summarized as follows:

1. There are no explosive characteristics of the generator.
2. The yield is high, considering the in situ production.
3. Spectrographic analysis reveals only $ClO_2$ migration across the membrane with not migration of chlorine.
4. The size of the generator may be varied to achieve the desired capacity of production.
5. The only moving parts of the generator itself are the operating pumps.
6. Adequate ventilation should be maintained during operation.
7. The process or the operation of the generator may be interrupted at any time.
8. Recovery and recycling of lithium is exceedingly simple, thus reducing costs for raw material and facilitating continuous operation.
9. The inventive generator can be used to introduce $ClO_2$ either in gaseous form or in aqueous solution into any water system.

What is claimed is:

1. A process of producing chlorine dioxide which comprises subjecting an aqueous solution consisting of lithium chlorite and water to electrolysis at a current flow of about 2–9 amperes in an electrolytic cell having an anode, a cathode and a semipermeable membrane separating said anode and said cathode, whereby chlorine dioxide is formed at the anode.

* * * * *